(12) United States Patent
Wilke

(10) Patent No.: US 8,474,474 B2
(45) Date of Patent: Jul. 2, 2013

(54) CONTROL VALVE HAVING PRESSURE BOUNDARY INTEGRITY DIAGNOSTIC CAPABILITIES, METHOD OF MAKING THE CONTROL VALVE, AND METHOD OF USING THE CONTROL VALVE

(75) Inventor: Galen Dale Wilke, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 995 days.

(21) Appl. No.: 12/501,166

(22) Filed: Jul. 10, 2009

(65) Prior Publication Data
US 2011/0006241 A1    Jan. 13, 2011

(51) Int. Cl.
*F16K 37/00* (2006.01)
*F16L 55/00* (2006.01)

(52) U.S. Cl.
USPC ............. 137/15.17; 137/15.18; 137/551; 137/552; 116/208; 138/36; 138/104

(58) Field of Classification Search
USPC . 137/15.08, 15.17, 551, 552, 15.18; 116/208; 138/36, 104; 73/1.88, 168, 866.5, 1.81
See application file for complete search history.

(56) References Cited

U.S. PATENT DOCUMENTS

| | | | | |
|---|---|---|---|---|
| 1,426,956 A | * | 8/1922 | Case | 138/36 |
| 1,975,832 A | * | 10/1934 | De Florez | 138/36 |
| 1,977,177 A | * | 10/1934 | De Flores | 138/36 |
| 3,845,657 A | * | 11/1974 | Hall et al. | 138/36 |
| 4,136,709 A | * | 1/1979 | Rogers et al. | 137/375 |
| 4,233,926 A | * | 11/1980 | Rogers et al. | 137/557 |
| 4,461,316 A | * | 7/1984 | Cove et al. | 137/557 |
| 4,617,822 A | * | 10/1986 | Davis | 138/36 |
| 4,735,229 A | * | 4/1988 | Lancaster | 137/375 |
| 4,874,007 A | * | 10/1989 | Taylor | 137/557 |
| 5,228,478 A | * | 7/1993 | Kleisle | 138/36 |
| 2002/0129860 A1 | | 9/2002 | Manzon | |
| 2006/0043326 A1 | | 3/2006 | Linkner et al. | |

FOREIGN PATENT DOCUMENTS

DE        102 54 219 A1    6/2004

OTHER PUBLICATIONS

International Search Report for PCT/US2010/035986, dated Oct. 14, 2010.
Written Opinion for PCT/US2010/035986, dated Oct. 14, 2010.

* cited by examiner

*Primary Examiner* — John Rivell
(74) *Attorney, Agent, or Firm* — Marshall, Gerstein & Borun LLP

(57) ABSTRACT

A method of diagnosing pressure boundary integrity of a control includes choosing a control valve having a valve body, determining a velocity profile within the control valve, choosing an area of the velocity profile, choosing a surface on an exterior of the valve body at or adjacent to the area, forming a pad on the exterior surface overlying the point, applying a testing device to the pad, and measuring a reference thickness of a wall of the valve body through the pad using the testing device. The method further includes applying the testing device to the pad at a time subsequent to measurement of the reference thickness, measuring a first thickness, and comparing the first thickness to the reference thickness. The comparison of the first thickness to the reference thickness can be used to calculate the amount of valve body wall lost during using and the remaining life of the control valve.

20 Claims, 4 Drawing Sheets

CONTROL VALVE HAVING PRESSURE BOUNDARY INTEGRITY DIAGNOSTIC CAPABILITIES, METHOD OF MAKING THE CONTROL VALVE, AND METHOD OF USING THE CONTROL VALVE

FIELD OF THE INVENTION

The present disclosure generally relates to a control valve having pressure boundary integrity diagnostic capabilities, a method of manufacturing the control valve, and a method of using the control valve.

BACKGROUND OF THE INVENTION

A major safety concern for process control valves is the loss of metal and wall thickness in the body of the valve. The high fluid velocities encountered by control valves can contribute to and accelerate wear caused by the process fluid. As a result, corrosion due to loss of protective coatings and metal loss due to cavitation are accelerated. Predicting the remaining life of a valve body or the need for maintenance by regularly testing the valve body for loss of metal and decrease in wall thickness is particularly troublesome as compared to pipes because the irregular shape of the valve body does not allow for use of conventional testing techniques such as ultrasonic testing.

Where the pressure differential is large, the high velocity created within the device can be detrimental. For example, in liquid systems the resulting high velocities can produce cavitation. This occurs when the pressure at the Vena Contracta falls below the vapor pressure of the liquid, producing vapor bubbles which subsequently collapse when the bubbles enter the relatively higher pressure region downstream. The collapse of these bubbles within the device may cause physical damage to the parts through erosion, which may shorten the useful life of the device.

SUMMARY OF THE INVENTION

In accordance with an embodiment of the invention, a method of manufacturing a control valve having pressure boundary diagnostic capabilities includes choosing a control valve having a valve body, determining a velocity profile within the control valve, choosing an area of the velocity profile, choosing a point on an exterior of the valve body at or adjacent to the area, forming a pad on the surface of the exterior of the valve body overlying the point, applying a testing device to the pad, and measuring a reference thickness of a wall of the valve body through the pad using the testing device.

In accordance with another embodiment of the invention, a method of manufacturing a control valve having pressure boundary integrity diagnostic capabilities includes choosing a control valve having a valve body, determining a velocity profile, choosing an area of the velocity profile, choosing a first point on an interior of the valve body at or adjacent to the area of high velocity, forming a boss on the interior surface overlying the point, forming a pad on the surface of the exterior of the valve body overlying at least a portion of the boss, applying a testing device to the pad, and measuring a reference thickness of a wall of the valve body, including the boss, through the pad using the testing device.

In accordance with yet another embodiment of the invention, a control valve having pressure boundary integrity diagnostic capabilities includes a valve body having a fluid inlet, a fluid outlet, a connecting valve body passageway, the valve body having an identified velocity profile, a valve seat mounted in the valve body passageway, a valve operating member adapted to cooperate with the valve seat to control the flow of fluid through the valve body passageway, a point chosen an exterior of the valve body at or adjacent to an area of the identified velocity profile, and a pad formed on the exterior of the valve body overlying the point.

In accordance with another embodiment of the invention, a control valve having pressure boundary integrity diagnostic capabilities includes a valve body having a fluid inlet, a fluid outlet, a connecting valve body passageway, the valve body having an identified velocity profile, a valve seat mounted in the valve body passageway, a valve operating member adapted to cooperate with the valve seat to control the flow of fluid through the valve body passageway, a first point chosen on an internal surface of the valve body at or adjacent to an area of the identified velocity profile, a boss formed on the internal surface of the valve body overlying the first point, and a pad formed on the external surface of the valve body overlying at least a portion of the boss.

In accordance with an embodiment of the invention, a method of diagnosing pressure boundary integrity of a control valve includes providing a control valve having a valve body, identifying a velocity profile within the valve body, choosing an area of the velocity profile, choosing a point on an exterior of the valve body at or adjacent to the area, forming a pad on the exterior surface overlying the point, applying a testing device to the pad, measuring a reference thickness of a valve body wall located through the pad, applying a testing device to the pad at a time subsequent to the measurement of the reference thickness, measuring a first thickness of the valve body wall through the pad, and comparing the reference thickness to the first thickness to determine the pressure boundary integrity of the control valve.

BRIEF DESCRIPTION OF THE DRAWINGS

For a more complete understanding of the disclosure, reference should be made to the following detailed description and accompanying drawings.

DETAILED DESCRIPTION

A control valve having pressure boundary diagnostic capabilities in accordance with the present invention includes a pad formed on an exterior of a valve body adjacent an area having an identified velocity profile. The pad can be formed on the exterior of any known valve type. For example, cage-type valves, globe valves, and rotary valves can be selected for forming a control valve having pressure boundary diagnostic capabilities.

Figure 1:
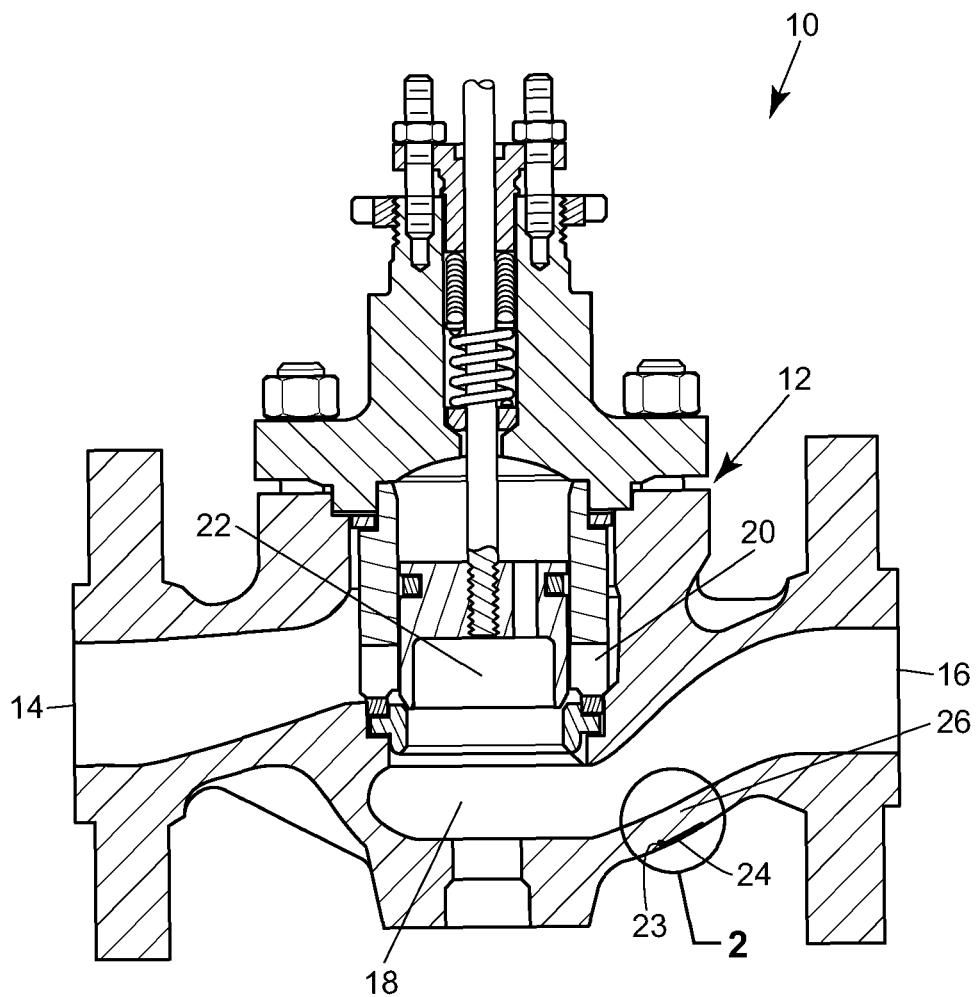
FIG. 1 is a cross-sectional view of a control valve having a pad in accordance with an embodiment of the invention.

Referring to FIG. 1, in general, a control valve 10 includes valve body 12 having a fluid inlet 14, a fluid outlet 16, and a connecting valve body passageway 18 disposed between the fluid inlet 14 and fluid outlet 16. The valve 10 further includes a valve seat 20 mounted in the valve body passageway 18, and a valve operating member 22 adapted to cooperate with the valve seat 20 to control the flow of fluid through the valve body passageway 18. A velocity profile of fluid flowing through the control valve 10 can be determined by any known conventional method, for example, using computational fluid dynamics. Areas of the velocity profile can be chosen for analysis. For example, the area or areas of the velocity profile chosen can be an area or areas of highest fluid velocity. For example, velocities in natural gas production with high pressure drops may be as high as sonic velocity and may include entrained sand and hydrocarbon liquid droplets. Similarly, steam and other compressible fluids may achieve sonic velocity when there is a high pressure drop. These areas of highest fluid velocities can cause a loss of metal and valve body wall 26 thickness.

Figure 2:
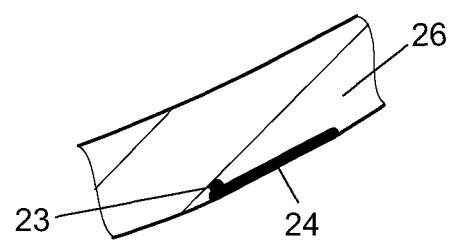
FIG. 2 is a partial view of the control valve of FIG. 1, showing the pad.

Referring to FIGS. 1 and 2, the control valve 10 includes a point 23 chosen on the exterior of the valve body 12 at or adjacent to the chosen area of the velocity profile. The point 23 can be chosen, for example, to be spaced about 0 inches to about 2 inches away from the chosen area of the velocity profile. Alternatively, the point 23 can be chosen to overly the chosen area of the velocity profile.

The control valve 10 further includes a pad 24 on the exterior of the valve body 12 overlying the point 23. For example, the pad 24 can be formed to be overlying the point 23 and to be at or adjacent the chosen area of the velocity profile. A control valve 10 having multiple chosen areas can include a point 23 chosen at or adjacent to each of the chosen areas, and multiple pads formed overlying each of the points 23.

The pad 24 can be formed, for example, during formation of the valve body 12. For example, a flat surface can be milled into the valve body 12 to form the pad 24. Alternatively, the pad 24 can be formed after formation of the valve body 12. For example, the pad 24 can be a raised surface formed on or attached to the exterior of the valve body 12 and then machined flat.

The pad 24 can be formed, for example, to be substantially parallel to the internal surface of the valve body 12. For example, the pad 24 can be formed to be parallel to the internal surface of the valve body 12 within a range of about 0° to about 15°. Preferably, the pad 24 is formed to be parallel to the internal surface of the valve body 12 with an offset of less than about 5°. The pad 24 can be formed to have a flat exterior surface. The pad 24 can have any suitable shape. For example, the pad 24 can be substantially rectangular or circular. The pad 24 can have a diameter in a range of about 1 mm to about 50 mm. Preferably, the pad 24 has a diameter of at least about 25 mm. The pad 24 can have a height in a range of about 1 mm to about 10 mm.

The flat surface of the pad 24 provides a suitable surface for use of testing devices, such as ultrasonic testing devices. A reference thickness of the valve body wall 26 located at or adjacent to the pad 24 can be measured, for example, by applying a testing device to the pad 24 to measure the thickness of the valve body wall 26. For example, an ultrasonic transducer can be used to measure the reference thickness of the valve body wall 26. The reference thickness represents the thickness of the wall at to, which can be prior to a first use of the control valve 10 or prior to continued use of the control valve 10. The pad 24 can be marked with the reference thickness. The pad 24 can be marked using any known methods. For example, the reference thickness can be etched onto the pad 24 or stamped onto the pad 24. The pad 24 can be further marked with an alignment marking to allow for consistent alignment of the testing device when making subsequent thickness measurements, as will be described in more detail below. The alignment markings can be, for example, an "X".

Figure 3:
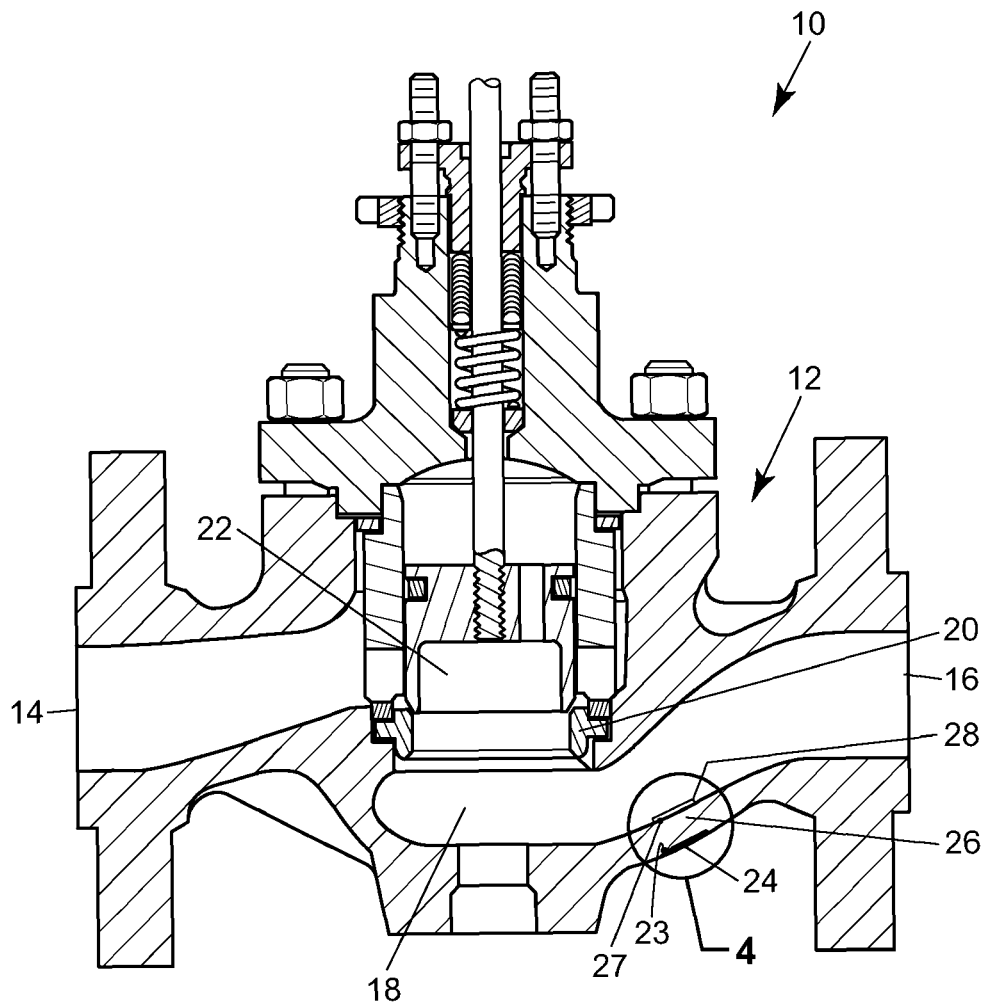
FIG. 3 is a cross-sectional view of a control valve having a pad and a boss in accordance with an embodiment of the invention.
Figure 4:
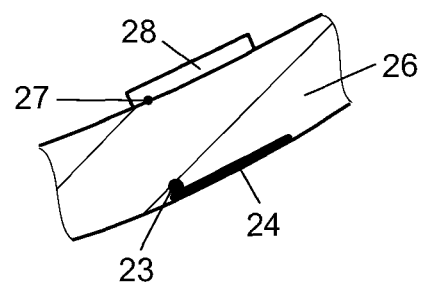
FIG. 4 is a partial view of the control valve of FIG. 3, showing the pad and boss.

Referring to FIGS. 3 and 4, the control valve 10 can further include a point 27 chosen on an interior surface of the valve body 12 at or adjacent to the pad 24 and/or the chosen area of the velocity profile. The point 27 can be, for example, spaced about 0 inches to about 2 inches from the chosen area and/or the pad 24.

The control valve 10 can also include a boss 28 formed on the interior surface of the valve body 12 overlying the point 27 at or adjacent to the chosen area of the velocity profile. The boss 28 can be formed across from and overlapping with at least a portion of the pad 24 formed on the exterior of the valve body 12. When more than one area of the velocity profile is chosen for analysis, a point 27 can be formed at or adjacent each of the chosen areas and a boss 28 can be formed overlying each of the points 27.

The boss 28 can be a raised internal surface of the valve body 12 relative to the surrounding valve body wall 26, which can provide an accelerated wear surface and a more conservative wear measurement. The boss 28 can be formed, for example, across from the pad 24 on the interior surface of the valve body 12. The boss 28 includes a first surface disposed at or adjacent to the interior of the valve body 12 and a second surface disposed in the valve body passageway 18. The second surface of the boss 28 can be oriented parallel to the surface of the pad 24 within a range of about 0° to about 15°. Preferably, the pad 24 is formed to be parallel to the internal surface of the valve body 12 with an offset of less than about 5°. The boss 28 can be flat. The boss 28 can have a thickness in a range of about 1 mm to about 20 mm. The thickness of the valve body wall 26 including the boss 28 can be measured using a testing device, such as an ultrasonic transducer, to determine a reference thickness. The reference thickness, including the pad 24 and the boss 28 can be in a range of about 10 mm to about 150 mm. The reference thickness including the boss 28 can be marked on the pad 24. The reference thickness can be marked, for example, by etching or stamping the pad 24.

The boss 28 can be formed of a material that wears at a rate greater than the wear rate of the valve body 12 to provide early warning of internal wear. Alternatively, the boss 28 can be formed of a material that is substantially the same as the interior of the valve body 12. The boss 28 can formed on the interior of the valve body 12 during formation of the valve body 12. For example, the boss 28 can be cast with the casting of the valve body 12. Alternatively, the boss can be attached to the inner surface of the valve body 12 after formation of the valve body 12. For example, the boss can be formed by weld deposition.

Figure 5:
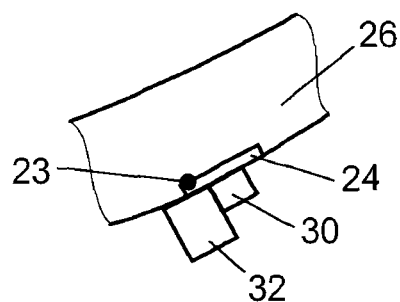
FIG. 5 is a partial view of a control valve having a pad and a testing device applied to the pad in accordance with an embodiment of the invention.

Referring to FIG. 5, the valve 10 can further include, for example, a testing device 30 operatively coupled to the exterior of the valve body 12, with at least a portion of the testing device 30 overlying at least a portion of the pad 24. The testing device 30 can be removably or permanently coupled to the valve body 12 at the pad 24. The testing device 30 can include, for example, a communication link 32. The communication link 32 can be connected to the testing device 30 through a wired or wireless connection. The communication link 32 can be operatively coupled to the valve body 12 and/or the testing device 30.

Figure 6:
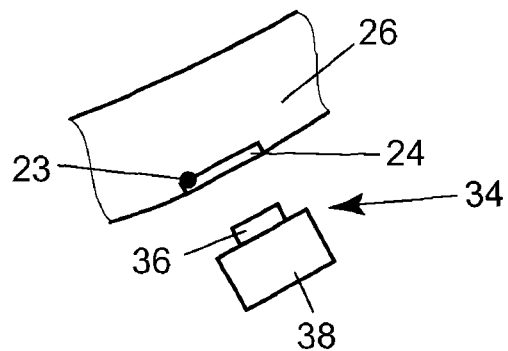
FIG. 6 is a partial view of a control valve having a pad with a handheld testing device being applied to the pad in accordance with an embodiment of the invention.

Referring to FIG. 6, a handheld testing device 36 having, for example, a communication link 38 operatively coupled to the testing device 36 can be applied and/or removably coupled to the exterior of the valve body 12, with at least a portion of the handheld testing device 36 overlying at least a portion of the pad 24.

Figure 7:
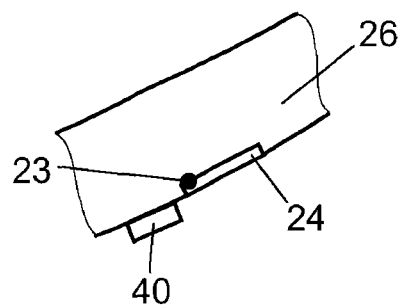
FIG. 7 is a partial view of a control valve having a pad and a calibration lug in accordance with an embodiment of the invention.
Figure 8:
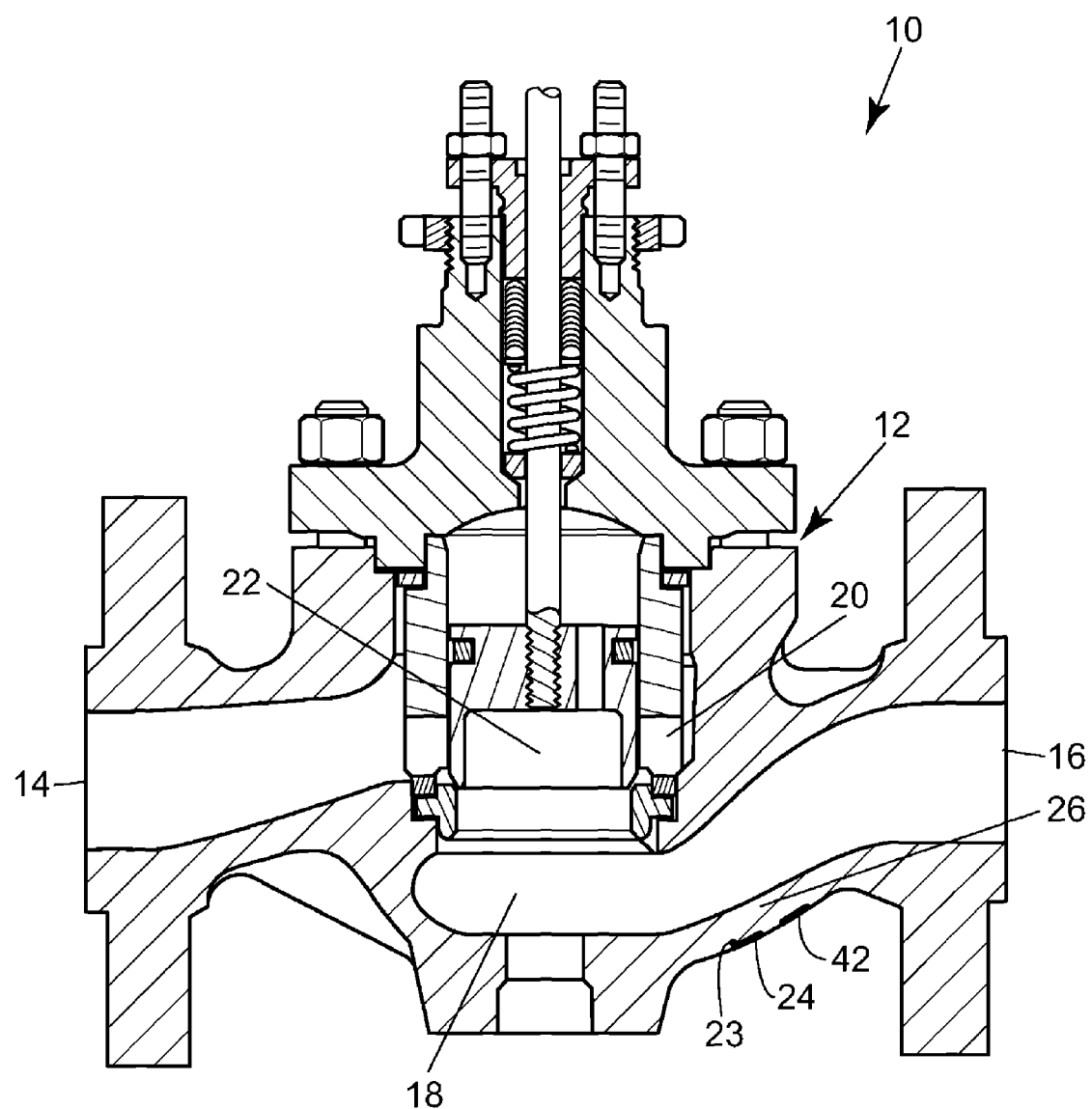
FIG. 8 is a cross-sectional view of a control valve having a pad and a calibration pad in accordance with an embodiment of the invention.

Referring to FIGS. 7 and 8, the valve 10 can further include a calibration device formed on exterior surface of the valve body 12. Referring to FIG. 8, the calibration device can be, for example, a calibration pad 42 formed on the exterior surface of the valve body 12. The calibration pad 42 at least partially overlies a calibration area of the velocity profile. The calibration area can be selected, for example, to be an area of the velocity profile having a non-erosive flow. The thickness of the valve body wall at the calibration pad 42 is known. A testing device can be calibrated by applying the testing device to the calibration pad 42 and measuring a thickness of the valve body wall through the calibration pad 42. The testing device can be adjusted as necessary based on the difference between reading from the testing device and the known thickness of the valve body wall at the calibration pad 42. The testing device can be calibrated, for example, prior to measuring the sample thickness of the valve body wall 26 through the pad 24. The testing device can be further calibrated, as needed, during subsequent measurement of the valve body wall 26 thickness. The calibration pad 42 can be formed, for example, in the same manner as the pad 24.

Referring to FIG. 7, the calibration device can be, for example, a calibration lug 40 can be formed on the exterior of the valve body 12. The calibration lug 40 can be located in any location of the valve body 12. Preferably, the calibration lug 40 is located so as not interfere with testing of the valve body wall thickness through the pad 24. The calibration lug 40 can outwardly project from the exterior surface of the valve body 12 and have a known thickness. A testing device can be calibrated by applying the testing device to the calibration lug 40 and measuring the thickness of the lug. The testing device can be adjusted as needed based on the difference between the reading from the testing device and the known thickness of the calibration lug 40. The calibration lug 40 can formed on the exterior of the valve body 12 during formation of the valve body 12. For example, the calibration lug 40 can be cast with the casting of the valve body 12. Alternatively, the calibration lug 40 can be attached to the exterior of the valve body 12 after formation of the valve body 12. For example, the calibration lug 40 can be formed by weld deposition.

To diagnose the pressure boundary integrity of the control valve 10, the thickness of the valve body wall 26 (and the boss 28 when used) through the pad 24 is measured at a time $t_1$ subsequent to the measurement of the reference thickness, which can be after the valve 10 has been in use for a predetermined amount of time. The thickness of the valve body wall 26 is again measured by applying a testing device, such as an ultrasonic transducer, to the pad 24 and measuring a first thickness through the pad 24. The first thickness is compared to the reference thickness to determine the pressure boundary integrity of the control valve 10. The change in thickness (first thickness—reference thickness) is indicative of the absolute material loss of the wall as a result of fluid flow at or adjacent to the chosen area. The thickness of the valve body wall 26 can be measured at subsequent times $t_2$, $t_3$, $t_4$, etc., and each measurement can be compared to each other and the reference thickness to provide a measurement of the absolute material loss over time. These measurements can also be used to determine the rate of material loss (the change in thickness/the change in time) of the valve body wall 26, which can be used to predict the remaining life of the control valve 10 and/or the need for maintenance.

When an internal boss 28 is used, the first thickness is a measure of the thickness of the valve body wall 26 and at least a portion of the boss 28. The first thickness is measured as described above, by applying a testing device to the pad 24 and measuring the thickness through the pad 24. In this case, the first thickness can represent the wear of the boss 28 alone to provide a more conservative measure of wear. When the boss 28 is made of a material that wears faster than the valve body 12, an accelerated wear surface is provided by the boss 28. The increased thickness of the valve body wall 26 provided by the boss 28 can be used to build in an automatic safety range into the valve body 12 design, as the wear of the boss 28 can be detected prior to significant wear of the valve body wall 26.

The preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed:

1. A method of manufacturing a control valve having pressure boundary integrity diagnostic capabilities, the method comprising:
   choosing a control valve having a valve body;
   determining a velocity profile within the control valve;
   choosing an area of the velocity profile;
   choosing a point on an exterior of the valve body at or adjacent to the area;
   forming a pad on the surface of the exterior of the valve body overlying the point, wherein a testing device can be applied to the pad to measure a sample thickness of a wall of the valve body through the pad; and
   forming a boss on an interior surface of the valve body overlying at least a portion of the pad.

2. The method of claim 1, wherein the boss is formed of a material having a first wear rate, the valve body is formed of a material having a second wear rate, and the first wear rate is greater than the second wear rate.

3. The method of claim 1, wherein the pad has a surface that is parallel to a surface of the boss within a range of about 0° to about 15°.

4. The method of claim 1, further comprising forming a calibration device on the exterior surface of the valve body, wherein the calibration device comprises a calibration pad on the exterior surface of the valve body and at least partially overlying a calibration area of the velocity profile or a calibration lug on the exterior surface of the valve body having a calibration thickness.

5. A method of manufacturing a control valve having pressure boundary integrity diagnostic capabilities, the method comprising:
   choosing a control valve having a valve body;
   determining a velocity profile within the control valve;
   choosing an area of the velocity profile;
   choosing a point on an exterior of the valve body at or adjacent to the area;

forming a pad on the surface of the exterior of the valve body overlying the point, wherein a testing device can be applied to the pad to measure a sample thickness of a wall of the valve body through the pad; and wherein the pad is parallel to an internal surface of the valve body located at or adjacent to the area, within a range of about 0° to about 15°.

6. The method of claim 5, further comprising operatively coupling a testing device to the valve body with at least portion of the testing device overlying at least a portion of the pad.

7. A control valve having pressure boundary integrity diagnostic capabilities, comprising:
   a valve body including an exterior surface, a fluid inlet, a fluid outlet, and a connecting valve body passageway, the valve body having an identified velocity profile;
   a valve seat mounted in the valve body passageway;
   a valve operating member adapted to cooperate with the valve seat to control the flow of fluid through the valve body passageway;
   a pad formed on the exterior surface of the valve body at or adjacent to a chosen area of the identified velocity profile, wherein the pad is adapted to receive a testing device to measure a sample thickness of a wall of the valve body through the pad; and
   a boss formed on an internal surface of the valve body overlying at least a portion of the pad.

8. The control valve of claim 7, wherein the boss is formed of a material having a first wear rate, the valve body is formed of a material having a second wear rate, and the first wear rate is greater than the second wear rate.

9. The control valve of claim 7, wherein a surface of the boss is oriented parallel to the pad within a range of about 0° to about 15°.

10. The control valve of claim 7, wherein the chosen area of the identified velocity profile is an area of the velocity profile having the highest velocity.

11. The control valve of claim 7, comprising a plurality of pads each formed adjacent a plurality of chosen areas of the identified velocity profile.

12. The control valve of claim 7, further comprising a calibration lug disposed on an external surface of the valve body, wherein the calibration lug has a calibration thickness.

13. A control valve having pressure boundary integrity diagnostic capabilities, comprising:
   a valve body including an exterior surface, a fluid inlet, a fluid outlet, and a connecting valve body passageway, the valve body having an identified velocity profile;
   a valve seat mounted in the valve body passageway;
   a valve operating member adapted to cooperate with the valve seat to control the flow of fluid through the valve body passageway;
   a pad formed on the exterior surface of the valve body at or adjacent to a chosen area of the identified velocity profile, wherein the pad is adapted to receive a testing device to measure a sample thickness of a wall of the valve body through the pad; and
   wherein the pad has a flat external surface.

14. The control valve of claim 13, further comprising a testing device operatively coupled to the valve body, wherein at least a portion of the testing device overlies at least a portion of the pad.

15. The control valve of claim 13, further comprising a calibration device on an exterior surface of the valve body, wherein the calibration device is selected from the group consisting of a calibration pad on an exterior surface of the valve body and at least partially overlying a calibration area of the velocity profile and a calibration lug disposed on an exterior surface of the valve body and having a calibration thickness.

16. A method of diagnosing pressure boundary integrity of a control valve, the method comprising:
   providing a control valve having a valve body;
   determining a velocity profile within the control valve;
   choosing an area of the velocity profile;
   choosing a point on an exterior of the valve body at or adjacent to the area;
   forming a pad on the exterior surface overlying the point;
   measuring a sample thickness of a valve body wall through the pad using a testing device;
   measuring a first thickness of the valve body wall through the pad at a time subsequent to the measurement of the sample thickness using the testing device; and
   comparing the sample thickness to the first thickness to determine the pressure boundary integrity of the control valve.

17. The method of claim 16, further comprising:
   forming a boss on an internal surface of the valve body overlying at least a portion of the pad, wherein the sample thickness and the first thickness include a thickness of the boss.

18. The method of claim 16, wherein choosing the area of the velocity profile includes choosing an area of the velocity profile having the highest velocity.

19. The method of any claim 16, further comprising:
   measuring a second thickness of the valve body wall through the pad at a time subsequent to the measurement of the first thickness using the testing device; and
   comparing the second thickness to the first thickness and the sample thickness to determine the pressure boundary integrity of the control valve.

20. The method of claim 16, further comprising:
   calibrating the testing device by applying the testing device to a calibration device on the control valve, wherein the calibration device is selected from the group consisting of a calibration lug formed on the exterior surface of the valve body and having a calibration thickness, and a calibration pad formed on the exterior surface of the valve body and at least partially overlying a calibration area of the velocity profile, wherein a valve body wall at the calibration pad has a calibration thickness and the calibration area of the velocity profile is an area of non-erosive flow.

* * * * *

UNITED STATES PATENT AND TRADEMARK OFFICE
CERTIFICATE OF CORRECTION

PATENT NO. : 8,474,474 B2
APPLICATION NO. : 12/501166
DATED : July 2, 2013
INVENTOR(S) : Galen D. Wilke Page 1 of 1

It is certified that error appears in the above-identified patent and that said Letters Patent is hereby corrected as shown below:

In the Specification:

At column 2, line 47, "invention; and" should be -- invention; --.

At column 2, line 49, "boss." should be -- boss; --.

At column 2, line 52, "invention." should be -- invention; --.

At column 2, line 55, "invention." should be -- invention; --.

At column 2, line 58, "invention." should be -- invention; and --.

In the Claims:

At Column 8, line 38, "any claim" should be -- claim --.

Signed and Sealed this
Twenty-eighth Day of April, 2015

Michelle K. Lee
*Director of the United States Patent and Trademark Office*